(12) United States Patent
Laun

(10) Patent No.: US 6,581,460 B1
(45) Date of Patent: Jun. 24, 2003

(54) METHOD AND DEVICE FOR DIRECT DIGITIZING MICROWAVE SIGNALS

(75) Inventor: Robert Laun, Hausach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 10/058,713

(22) Filed: Jan. 28, 2002

(51) Int. Cl.$^7$ .......................... G01F 23/284; G01F 23/00
(52) U.S. Cl. ........................ 73/290 V; 73/290 R; 73/592
(58) Field of Search ............................... 73/290 V, 592, 73/290 R, 570

(56) References Cited

U.S. PATENT DOCUMENTS

| | | | |
|---|---|---|---|
| 4,000,418 A | 12/1976 | Waldron et al. | 250/211 |
| 4,271,488 A | 6/1981 | Saxe | 365/230 |
| 5,144,525 A | * 9/1992 | Saxe et al. | 365/45 |
| 5,200,983 A | * 4/1993 | Kogan | 377/57 |
| 5,557,618 A | 9/1996 | Kogan et al. | 371/10.3 |
| 5,847,567 A | 12/1998 | Kielb et al. | 324/642 |
| 6,087,978 A | * 7/2000 | Lalla et al. | 342/124 |

FOREIGN PATENT DOCUMENTS

| | | |
|---|---|---|
| DE | 30 13 253 C2 | 10/1983 |
| DE | 42 40 491 A1 | 6/1994 |
| DE | 44 01 346 A1 | 7/1994 |
| DE | 44 07 396 C2 | 9/1995 |

OTHER PUBLICATIONS

Skolnik, "Introduction to Radar Systems", McGraw–Hill, Inc., 1980, pp. 23–29.
Devine, "Radar Level Measurement—The User's Guide", Vega Controls Ltd., 2000, pp. 47–75.
"CompuScope 85G" GaGe, A Tektronix Technology Company, Apr. 10, 2001, 1 page.
Maxim Integrated Products, "Maxim Max 108 ±5V, 1.5Gsps, 8–Bit ADC with On–Chip 2.2GHz Track/Hold Amplifier", Rev. 0, Sep. 1999, pp. 1–32.

* cited by examiner

Primary Examiner—Hezron Williams
Assistant Examiner—Rodney Frank
(74) Attorney, Agent, or Firm—Fay Kaplun & Marcin LLP

(57) ABSTRACT

A method and a device for directly digitizing microwave signals reflected on a filling product surface of a filling product present in a receptacle, wherein the microwave signals reflected on the filling product surface are scanned, and the analog values resulting from said scanning process are stored in an analog value storage means. The stored analog values are then read out from the analog value storage means at a lower rate as compared to the scanning rate, and are converted into digital values. The digital values may then be made available to an evaluation means for determining the filling level height.

25 Claims, 10 Drawing Sheets

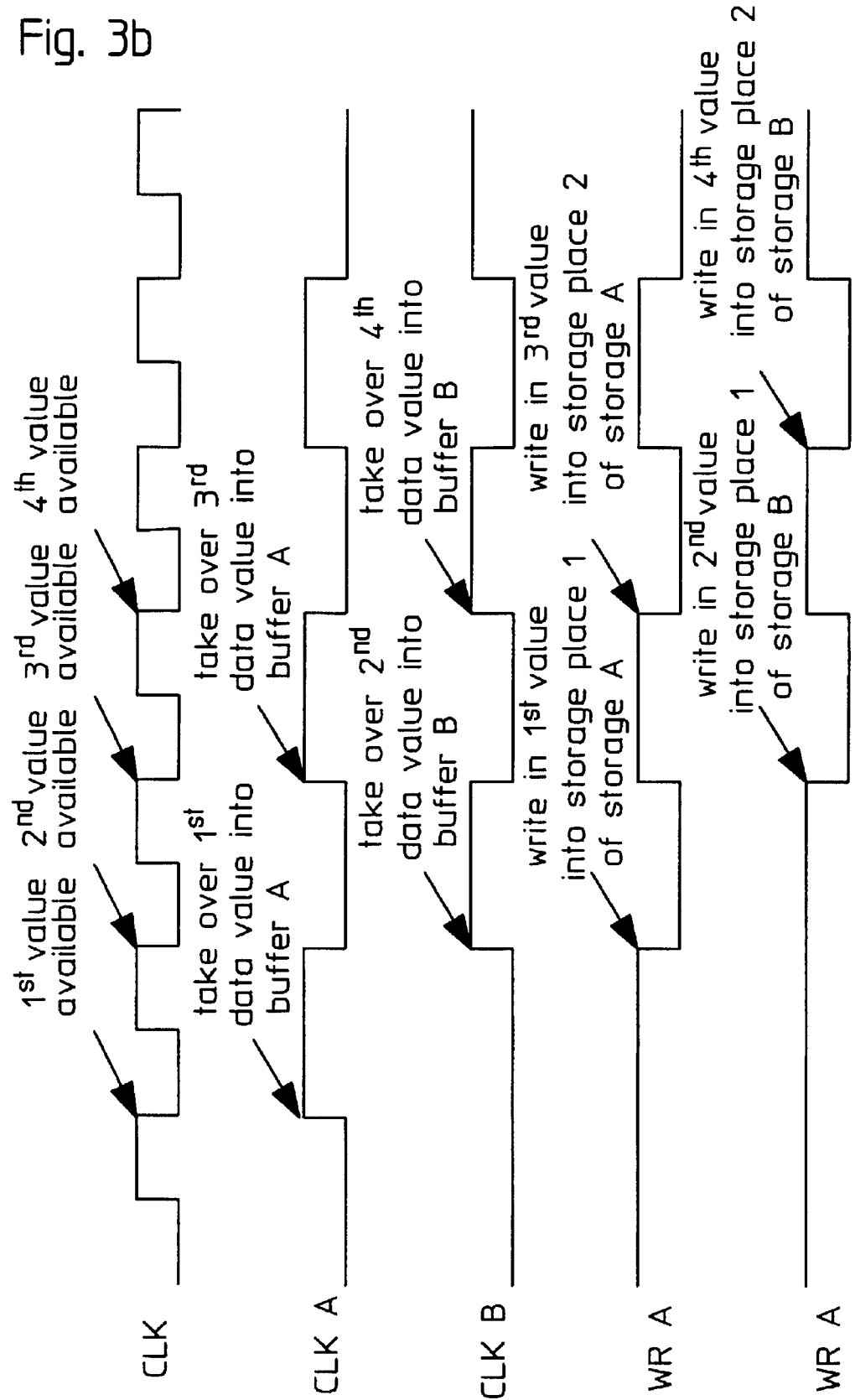

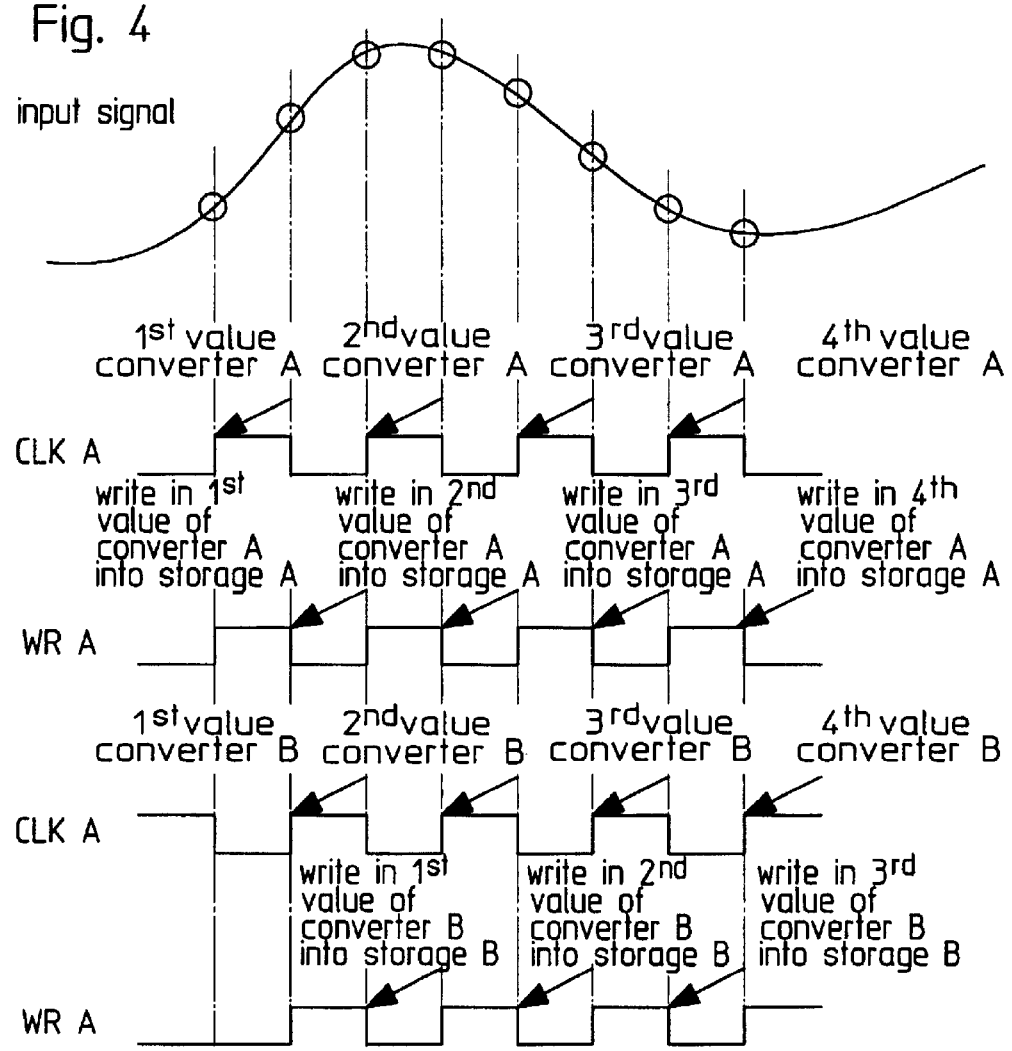
Fig. 4
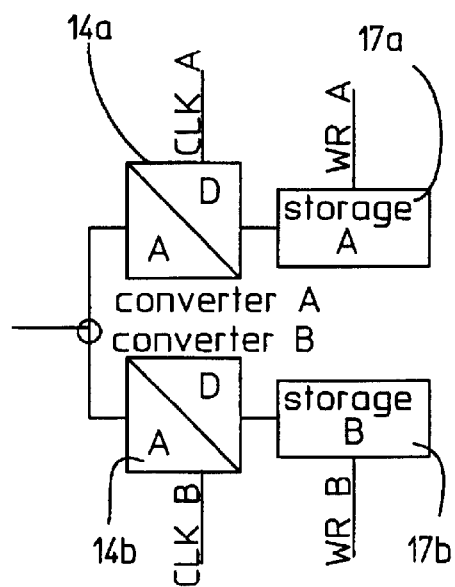

METHOD AND DEVICE FOR DIRECT DIGITIZING MICROWAVE SIGNALS

FIELD OF THE INVENTION

The present invention relates to a method and a device for directly digitizing microwave signals reflected on a filling product surface of a filling product present in a receptacle, and to a filling level measuring device working on the transit time principle and emitting microwave signals.

BACKGROUND INFORMATION

In simplified terms, microwave signals are generated (in a pulsed or continuous manner) by a transmitting means in a filling level measuring device, and are radiated via an antenna, such as, for example, a horn, rod or microstrip antenna into the direction of the filling product surface to be measured or are guides to the filling product surface by means of a waveguide (rod, cable or also rope). The microwave signals reflected on the filling product surface—in general also designated as echo signals—may be fed to a reception circuit and scanned via a receiving means, often identical to the transmitting antenna; or by means of the aforementioned waveguide. The analog values resulting from said scanning are converted into digital values, and are then made available to an evaluation means. From the digital values, the filling level height is determined in the evaluation means.

Reference is, for example, made to the document DE 42 40 491 A1, in which such a measuring device is disclosed in general. For processing the reflected and received microwave signals, various analog circuits or components are present so as to generate a so-called envelope curve, which will then be digitized for determining the filling level height therefrom. The generation of an envelope curve is well known, and, correspondingly, there is no need for further explanations as to this technology (with respect to the generation of the envelope curve, reference is made, for example, to DE 44 07 396 C2 and M. Scholnik "Introduction to Radar Systems", $2^{nd}$ edition, 1980, McGraw-Hill; Peter Devine "Radar level measurement—the user's guide", VEGA Controls Ltd., 2000, ISBN 0-9538920-0-X, which are hereby included by reference).

In the present technical field, microwave signals are worked with that have a frequency of 1 to 30 GHz or more. Due to these high frequencies, various analog circuits or components may be necessary for determining the exact filling level height from the received microwave signals. In particular, a so-called mixer has inter alia to be used, with the assistance of which a temporal "elongation" of the envelope curve is carried out, so that the scanning of the envelope curve by means of conventional A/D converter (pulse frequencies of about 25 microseconds) with a sufficient fine scanning screen is possible (for achieving a sufficient precision of the determined filling level height). This means that microwave pulses are in particular transformed into another frequency and time domain by means of the mixer and the associated oscillator. Hereby, pulses are for example temporally elongated after time transformation approximately by a factor of 160,000, whereby a pulse duration of 1–2 nanoseconds before the transformation corresponds to a pulse duration of about 160–320 microseconds after the transformation. These time-elongated pulses are then fed to the A/D converter that scans said signal in a scanning screen of about 25 microseconds. Thus, with a pulse length of 160 microseconds, six scanning values are available per pulse. With these values, accuracies of about 5 mm may be obtained in the determination of the filling level height. It has to be pointed out that the precision of the filling level determination is also dependent on the height of the scanning values per echo pulse, on the gradient of the pulse flanks, and on the accuracy of the A/D converter.

In summary, it has to be stated that devices for determining the filling level height basing on reflected microwaves, in particular microwave pulses, perform an analog processing of the received signals for being able to achieve the desired accuracy in the filling level height determination. Thus, for example, reference is made to the document U.S. Pat. No. 6,087,978 that discloses a pulsed radar-filling level measuring device, wherein the microwave signals are transformed into another frequency and time domain with the assistance of a mixer and an associated oscillator so as to be able to carry out the scanning of the signals and the digitization of the scanning values. In the document U.S. Pat. No. 5,847,567, a filling level measuring device is described that is either configured as a FMCW radar device or as a pulsed radar device. With the configuration as an FMCW radar device, a mixer of the aforementioned kind is present serving for the transformation of the frequency domain, as well as the time domain of the incoming signals. Then, an analog-digital conversion of the signals is performed. With the configuration as a pulsed radar device, a transformation is performed in the above-described manner by means of a timing circuit.

It is believed that the use of analog components or analog switching technique, however, is affected with disadvantages. Thus, with the dimensioning of the circuit, component tolerances and fabrication divergences have to be taken into consideration, and have also to be monitored during the production. Analog components moreover exhibit temperature-dependence, which have to be considered and cause a not inconsiderable test expenditure. It is believed that temperature-dependence and component tolerances in addition result in a decrease of the reproducibility and accuracy of the initial signals, and have to be minimized or compensated by an additional expenditure. It is also believed that a disadvantage has also to be seen in that modifications in the functional mode of such an analog, circuit can only be carried out at a high expenditure. Finally, it is believed that analog circuits also are sensitive to disturbing influences.

SUMMARY OF THE INVENTION

A technical problem on which an exemplary embodiment of the present invention is based, consists in providing a method and a device by means of which the number of analog circuit components in devices of the mentioned kind can be reduced, and the above-described disadvantages are therewith at least decreased.

It is believed that this technical problem may be solved according to a first aspect of the invention by an exemplary embodiment of a method for directly digitizing microwave signals reflected on a filling product surface of a filling product present in a receptacle, wherein the microwave signals reflected on the filling product surface are scanned, and the individual scanning values resulting from said scanning, are stored in an analog value storage means, stored analog values having a lower rate as compared to the scanning rate being read out from the analog value storage means and being converted into digital values made available to an evaluation means for determining the filling level height.

According to another exemplary embodiment of the method it is provided that the microwave signals are scanned either unchanged in their frequency or substantially unchanged at a high scanning rate corresponding to this frequency, and that the analog values generated by the scanning process are stored at a storage rate corresponding to the scanning rate in a so-called FISO system, and that furthermore, the analog values stored in said FISO system are read out from said FISO system at a lower read-out rate as compared to the storage rate, and are converted into digital values, and that these digital values in turn are stored in a digital value storage means at a storage rate corresponding to said read-out rate, and that finally, the evaluation means for determining the filling level height, accesses the digital value storage means for reading out the therein stored digital values.

Such circuit arrangements are designated as FISO system (Fast In Slow Out) allowing for a fast read-in of analog values—hence at a very high frequency or a high scanning rate—and outputting said values in a slower manner, so that one or several A/D converters of the conventional construction can be connected thereto. FISO systems usable here, are in principle disclosed, for example in the documents U.S. Pat. No. 5,144,525 A or U.S. Pat. No. 5,200,983 A. A Waveform Digitizer Card, which can basically be used here, is distributed under the designation "Compuscope 85G" by the company GAGE which is affiliated with Tektronix Technology Company.

According to another exemplary embodiment of a method according to the above-given explanations which is believed to be advantageous, the analog values present in the analog value storage means are converted into digital values by several A/D converters. It is believed that the use of several A/D converters has the advantage that the rate at which the analog value storage means has to be read out, is allowed to be slightly higher than with the previously explained embodiment. Then, in this case, various analog values have to be sent to various A/D converters. The A/D converters themselves can then in turn be operated at a lower conversion rate, so that conventional A/D converters can be used for this purpose.

According to another aspect of an exemplary embodiment of the present invention, a device for directly digitizing microwave signals reflected on the filling product surface of a filling product present in a receptacle is proposed, comprising: a reception circuit into which the reflected microwave signals have to be fed, and which is configured having a predetermined scanning rate for scanning same, an analog value storage means connected with said reception circuit for storing the analog values generated by said storage process at a storing rate corresponding to the scanning process, at least one A/D converter connected with said analog value storage means, which A/D converter converts the stored analog values into digital values, and a control means for controlling the reception circuit, the analog value storage means and the at least one A/D converter in such a manner that the microwave signals are scanned at the predetermined scanning rate, and are stored in the analog value storage means at a storing rate corresponding to said scanning rate, that the stored analog values are read out from the analog value storage means at a read-out rate lower than the storing rate and are converted into digital values in the A/D converter, and that the digital values are made available to an evaluation means for determining the filling level height.

According to still another aspect of an exemplary embodiment of the present invention, a device for directly digitizing microwave signals reflected on the filling product surface of a filling product present in a receptacle is proposed, comprising: a reception circuit into which the reflected microwave signals have to be fed, and which is configured having a predetermined scanning rate for scanning same, an analog value storage means connected with said reception circuit for storing the analog values generated by said storage process at a storing rate corresponding to the scanning process, at least one A/D converter connected with said analog value storage means, which A/D converter converts the stored analog values into digital values, and a control means. The control means controls the reception circuit, the analog value storage means, the at least one A/D converter, and the digital value storage means in such a manner that the microwave signals are scanned at the predetermined scanning rate, and are stored in the analog value storage means at a storing rate corresponding to said scanning rate. Moreover, it is hereby controlled that the stored analog values are read out from the analog value storage means at a read-out rate lower than the storing rate, and are converted into digital values in the A/D converter, and that the digital values are stored in the digital value storage means. The values hitherto stored in the digital value storage means are then available to an evaluation means for determining the filling level height.

One aspect of an exemplary embodiment of the present invention is based for the first time on the idea of no longer temporally "elongating" the received microwave signals by means of a mixer, but of digitizing temporally "non-elongated" microwave signals by means of one or several A/D converters. For being able to achieve scanning rates required for a sufficient measurement accuracy notwithstanding the non-performance of temporal elongation, and of being able to use a digital value storage means having usual commercial access times despite of that, the analog value storage means rapidly reading specific analog values but outputting same in a slower manner, is provided. Through this device, known as such as FISO system, scanning rates can be achieved as with prior art with time elongation (by means of analog components) in spite of the very high frequencies of the "non-elongated" microwave signals. As soon as the corresponding digital values are stored in a digital value storage means, the processing of the digital values occurs and, hence, the evaluation takes place in the conventional manner. This means that the very high frequencies due to the no longer present mixer of the signals to be digitized, and therewith the necessary very high scanning rates, are "intercepted" by the use of a FISO system.

If only one A/D converter is used for digitizing the microwave signals or the therefrom determined envelope curve, then it is purposeful under certain circumstances to provide at least two buffers between the A/D converter and the final storage unit, into which buffers digital values are alternatively written in. Thereby, even with conventional memory components such as SRAM or DDR-SRAM having cycle times of, for example, 2.5–5 ns, the high frequency of the AID converter can be employed. The more buffers provided, the slower the memory modules are allowed to work.

Therewith, it is believed that it is possible according to an aspect of the present invention to perform a digitization with conventional modules despite the immensely high frequency of the input signals, a fact that eliminates the disadvantages of analog components, and in particular of the previous mixer.

By using a FISO system, it may also be possible for the first time to use hitherto usual "slow" A/D converters.

The exemplary embodiment of the device according to the present invention for the direct digitization according to the aforementioned explanations can be arranged as a single constructional unit spaced apart from the remaining components of a filling level measuring device. It is believed that it is, however, particularly purposeful to provide such devices or such a circuit directly within the filling level measuring device. Said device or said circuit may then preferably accommodated in the housing of a filling level measuring device. For the further explanation and the better understanding, several embodiments of the invention are described in more detail in the following with reference to the attached drawings.

BRIEF DESCRIPTION OF THE DRAWINGS

FIG. 3b shows schematic representation of an exemplary scanning scheme realized in the modified exemplary embodiment of the present invention as per FIG. 2.

FIG. 4 shows detail of a further modified exemplary embodiment of the present invention as per FIG. 2, and an exemplary embodiments of an associated scanning and storage scheme.

DETAILED DESCRIPTION

Figure 1:
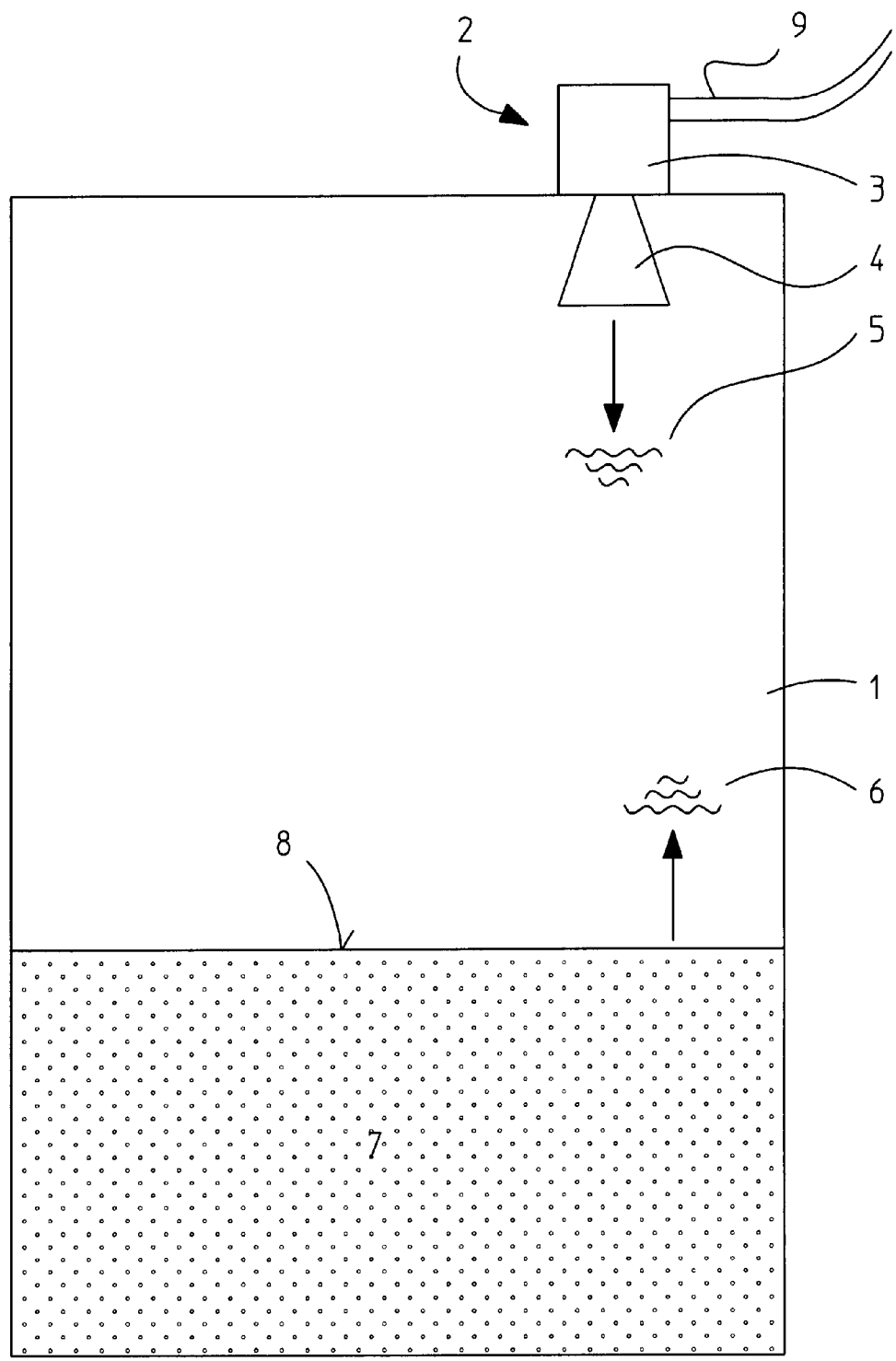
FIG. 1 shows a schematic representation of an exemplary embodiment of a receptacle with a filling, level measuring device.

With reference to FIGS. 1 and 5 through 8, an exemplary embodiment of a principal functional mode and a principal configuration of a filling level measurement device according to the present invention will first be explained. As can be seen from FIG. 1, a filling level measuring device 2 may be mounted in the top zone of a receptacle 1, which filling level measuring device is comprised of an electronic unit 3 and a horn antenna 4. The filling level measuring device 2 is connected to a remote control panel or such like via a two-wire loop 9. Via the two-wire loop 9, which is in particular configured as a 4–2 mA two-wire loop, the communication as well as the energy supply of filling level measuring device 2 takes place. In the electronic unit 3, microwave pulses are generated and are radiated via horn antenna 4 into the direction of the bulk filling material present in receptacle 1. The microwave pulses 5 are reflected on the bulk filling material surface 8, and are again received by horn antenna 4 as echo signal 6.

The generation of microwave pulses 5 or of pulse packets, and the processing of reflected pulses 6 is described in more detail by means of FIGS. 5–8. The microwave pulse is generated in a pulse generator 10, and is transferred across a circulator 11 or a directional coupler to horn antenna 4, and is radiated from there. The received echo signal in turn is transferred via the circulator 11 or directional coupler to a pre-amplifier 12 serving for amplifying the received microwave signal. A mixer 19 is connected downstream of pre-amplifier 12 and is in turn connected with a local oscillator 20. In mixer 19, the received echo signal is mixed with the fixed frequency signal of local oscillator 20 for transforming the echo signal into a lower frequency range (in particular kHz range). In this transformnation, a time elongation of the received echo signal is obtained by suitably matching oscillators 10 and 20; for more details hereto, reference is made, for example, to the documents DE 31 07 444 C2.

Figure 6:
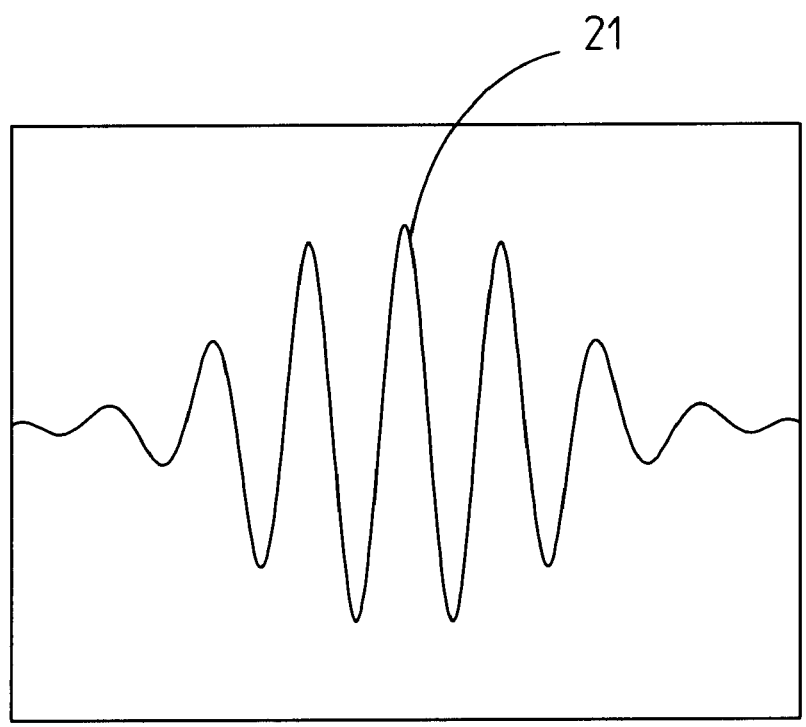
FIG. 6 shows a representation of a microwave pulse.
Figure 7:
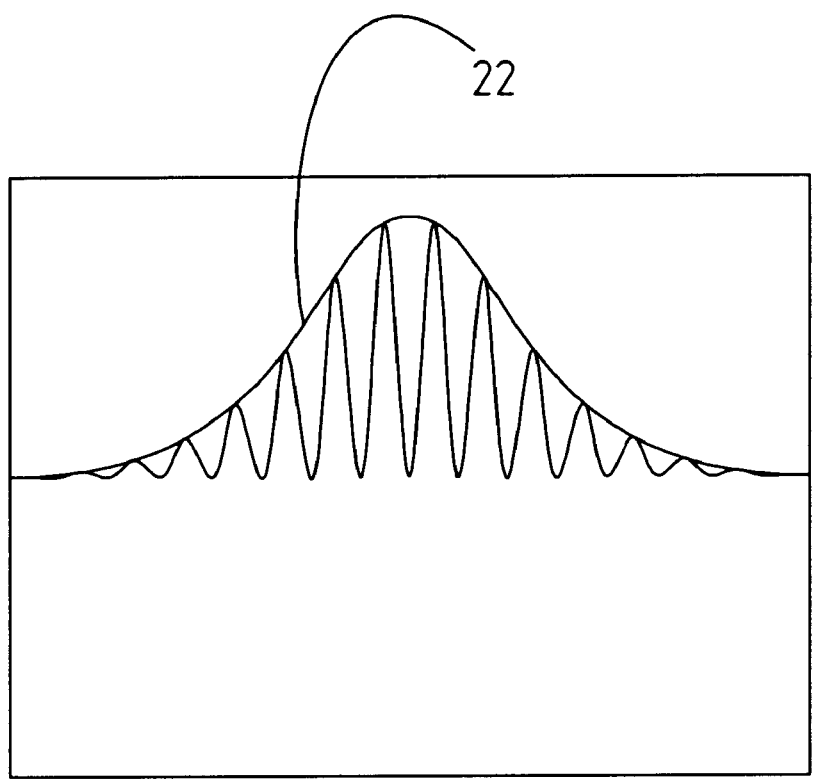
FIG. 7 shows a representation of an envelope curve.
Figure 8:
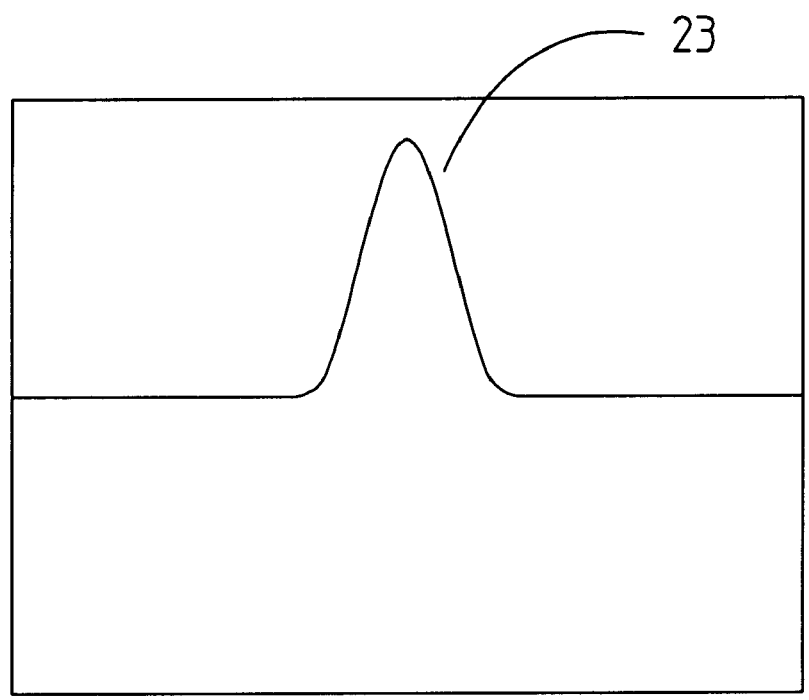
FIG. 8 shows a representation of a monopulse.

The output signal of mixer 19, which corresponds to the microwave pulse packet 21 as per FIG. 6 or the monopulse 23 as per FIG. 8, is then filtered by a low-pass filter 13 and digitized by an A/D converter 14. By low-pass filter 13, an envelope curve 22 as per FIG. 7 is formed. For making a larger dynamic range available to the A/D converter, a logarithmic or controllable amplifier may be provided upstream of A/D converter 14.

The digitized values from A/D converter 14 are stored in a memory 17 for the further processing. A signal processing or evaluation means 18 not described in more detail here since it corresponds to prior art, accesses this memory. A control unit 26 is responsible for starting the A/D converter and for transferring the converted values into memory 16. Alternatively hereto, control unit 26 or pulse generator 10 may preset the starting moment of the pulse generation and, hence, the start of the measurement operation.

It has still to be noted here that with the previous realizations, the parts 14, 17, 18 and 26 are in most cases components of a microprocessor, or are realized by such a microprocessor. When pulse packets are used as transmitting pulses, a rectifier has to be provided upstream of a possible logarithmizing process.

Figure 2:
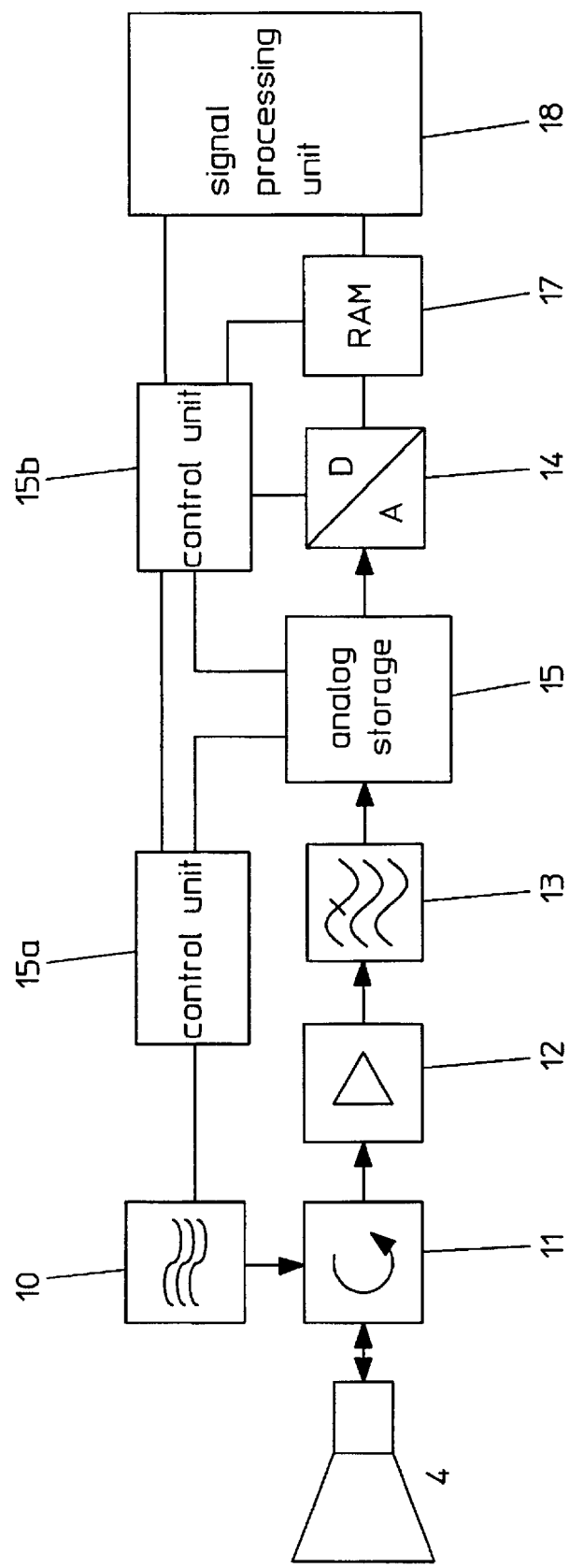
FIG. 2 shows a schematic representation of an exemplary embodiment of the electronic components of a filling level measuring device according to an exemplary embodiment of the present invention.

According to an exemplary embodiment of the present invention, it is provided to omit the mixer 19 and the associated local oscillator 20; cf. FIG. 2. In this exemplary embodiment, an analog value storage means 15 configured as a "FISO system" is interconnected between low-pass filter 13 and A/D converter 14. This means that the microwave pulses or input signals coming in via the modules 4, 11, 12 and 13, are scanned "non elongated" at a high scanning rate, and are memorized in the analog value storage means 15. Through a control unit 15a, the analog value storage means is controlled in a manner that it scans the input signals at a scanning rate necessary for the desired measurement accuracy, and memorizes the respective obtained analog values. A/D converter 14 accesses the analog value storage means 15, and reads out the analog values to be converted into digital values from the analog value storage means 15 at a rate that is by far slower than the scanning rate. Therewith, it is possible to configure A/D converter 14, despite the high scanning rate, as a usual converter having a read-in rate which is not as high as that of the analog value storage means 15. A further control unit 15b controls the read-out of the analog values from the analog value storage means, and the A/D converter 15, as well as the memory means 17 and the signal processing means 18. It has still to be noted here that the control units 15a and 15b can also be combined, and can in particular be integrated on a microchip.

For achieving the scanning rate necessary for the desired measurement accuracy, and for being able to use usual memory modules, it is also possible to connect the A/D converter 14 with a plurality of buffers 16a, 16b, which in turn are connected with the final memory means 17 comprised of several memory modules 17a, 17b. Of course, it may also be possible to provide the final memory means 17 individually for each single buffer 16a, 16b such as it is shown in the FIGS. 3a and 3c.

Figure 3A:
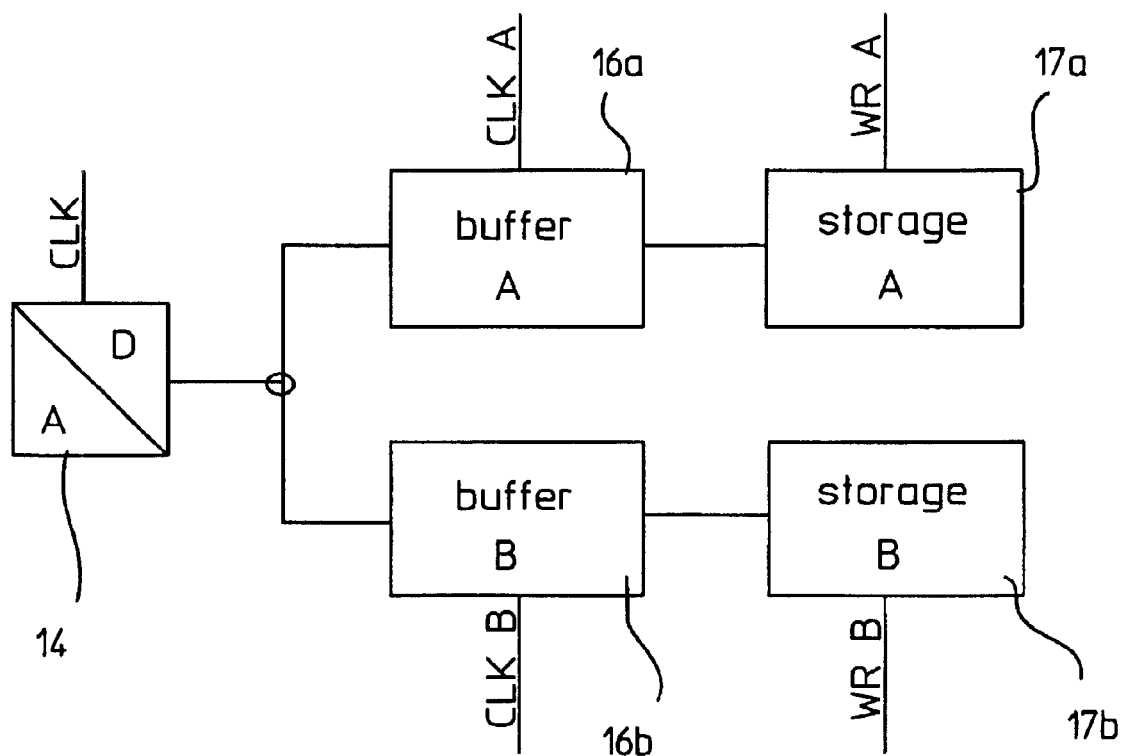
FIG. 3a shows a detail of a modified exemplary embodiment of the present invention as per FIG. 2.
Figure 3C:
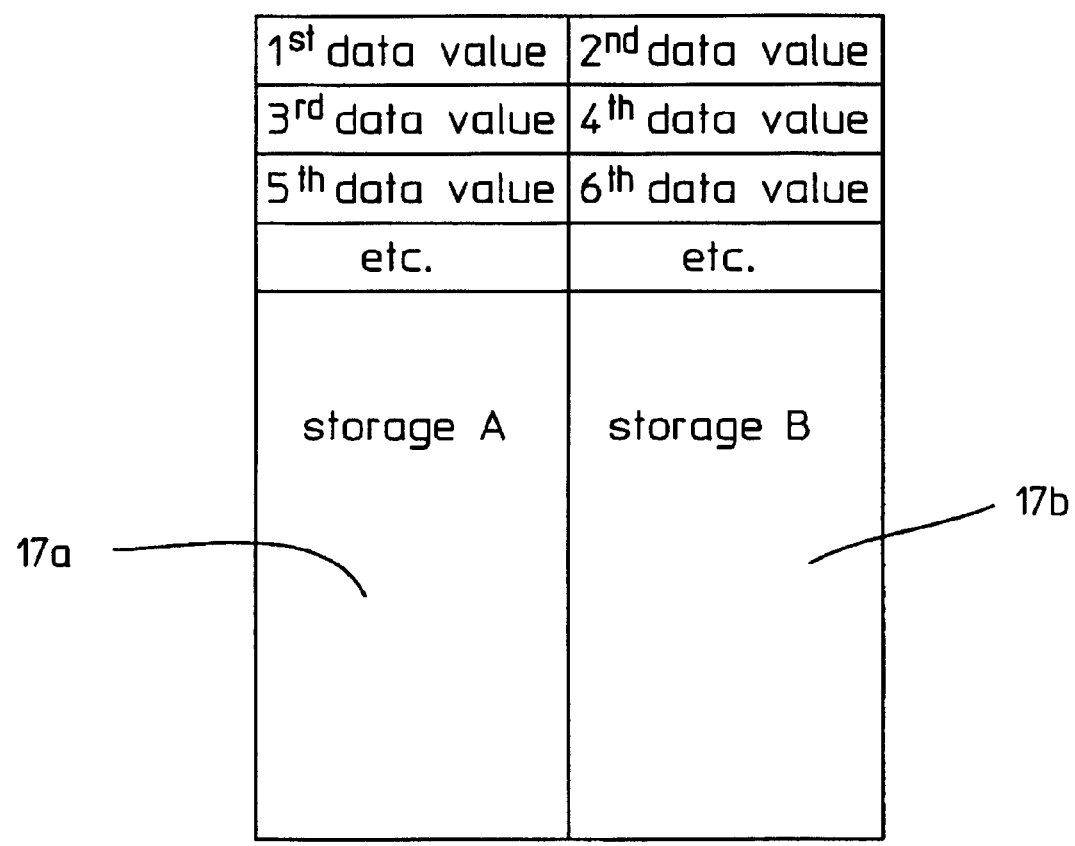
FIG. 3c shows a schematic representation of an exemplary storage scheme realized in the modified exemplary embodiment of the present invention as per FIG. 2.
Figure 5:
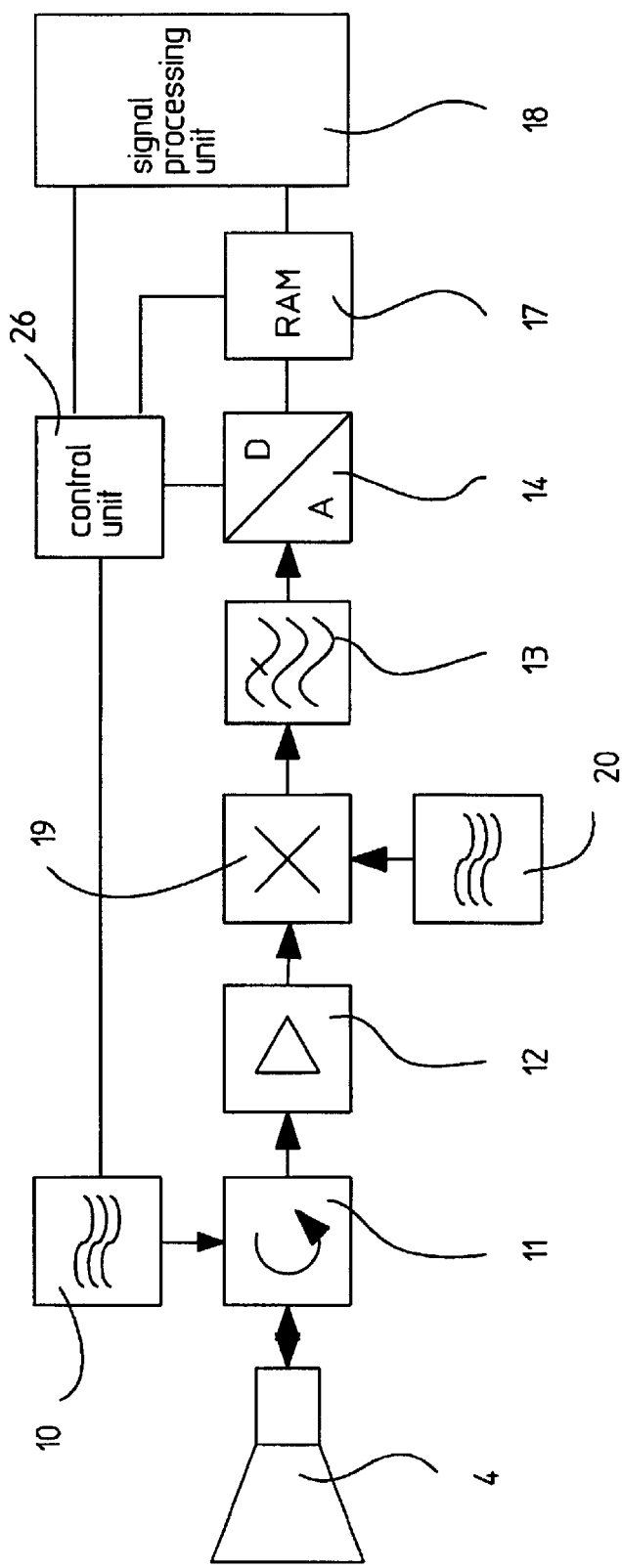
FIG. 5 shows a schematized representation of the electronic components of a device according to the prior art.

As it is schematically shown in the FIGS. 3a–3c, the first data value is now stored in buffer 16a, thus, buffer 16b is available for the storage of the next data value. At the same time, the stored value has already been written into final memory 17 by buffer 16a, so that now buffer 16a is again available for the third data value. Therewith, all data values are finally present in the final memory unit 17 or 17a, 17b. When single final memory units 17a, 17b are present, then, the first, third and fifth data value, etc., is stored in buffer 17a, and the second, fourth and sixth, etc., data value is memorized in buffer 17b. Both final memory units 17a, 17b, are in turn available to evaluation means 18.

By using a monopulse 23 as per FIG. 8, low-pass filter 13 and a possible rectification in pre-amplifier 12 can be renounced of.

As an alternative to the realization as per FIGS. 3a–3c, a device including several A/D converters 14a, 14b may be used in the embodiment as per FIG. 4. By using two or more A/D converters, the scanning rate can be increased.

The two A/D converters 14a and 14b each are connected with a final memory unit 17a and 17b. The first value of the echo signal is detected in the A/D converter 14a, and is stored in the final memory unit 17a. The next value is converted by A/D converter 14b and is stored in the associated final memory unit 17b. The next value of the echo signal is then again converted by the first A/D converter 14a. While the digitization of a value takes place in an A/D converter 14a, 14b, a storing is performed in the other "branch", so that the A/D converter is again available for the next clock pulse.

Of course, it may also be possible to combine various features of the single described alternative embodiments of the invention with each other.

| | List of Reference Numerals |
|---|---|
| 1 | Receptacle |
| 2 | Filling level measuring device |
| 3 | Housing including electronic unit |
| 4 | Horn antenna |
| 5 | Emitted microwave pulse |
| 6 | Reflected microwave pulse |
| 7 | Filling product |
| 8 | Filling product surface |
| 9 | 4-29mA two-wire loop |
| 10 | Oscillator |
| 11 | Circulator |
| 12 | Pre-amplifier |
| 13 | Low-pass filter |
| 14 | A/D converter |
| 14a | A/D converter |
| 14b | A/D converter |
| 15 | Analog value storage means |
| 15a | Control unit |
| 15b | Control unit |
| 16a | Buffer |
| 16b | Buffer |
| 17 | Digital value storage means, final memory |
| 18 | Evaluation means |
| 19 | Mixer |
| 20 | Local oscillator |
| 21 | Microwave pulse |
| 22 | Envelope curve |

-continued

| | List of Reference Numerals |
|---|---|
| 23 | Monopulse |
| 26 | Control unit |

What is claimed is:

1. A method for directly digitizing microwave signals reflected on a filling product surface of a filling product present in a receptacle, the method comprising:

scanning the microwave signals reflected on the filling product surface at a first rate for generating individual analog values;

storing the individual analog values in an analog value storage means;

reading the stored individual analog values from the analog value storage means at a second rate, wherein the second rate is lower than the first rate;

converting the individual analog values into digital values; and supplying the digital values to an evaluation means for determining a filling level height.

2. The method of claim 1, wherein the microwave signals are not elongated for the scanning.

3. The method of claim 1, wherein the microwave signals have a frequency and the microwave signals are amplified without the frequency being substantially changed, and wherein the amplified microwave signals are not elongated for the scanning.

4. The method of claim 1, wherein the digital values are stored in a digital value storage means, to which accesses the evaluation means for determining the filling level height.

5. The method of claim 1, wherein the analog value storage means includes a FISO system.

6. The method of claim 5, wherein the individual the analog values generated by the scanning are stored in the FISO system at a third rate corresponding to the first rate;

wherein the second rate is low in comparison to the third rate; and wherein the digital values are stored in a digital value storage means at a fourth rate, the fourth corresponding to the second rate.

7. The method of claim 1, wherein the conversion of the individual analog values stored in the analog value storage means into digital values is carried out by means of at least one A/D converter.

8. The method of claim 7, wherein the at least one A/D converter is operated for a time span of 1 ns–0.5 $\mu$s, in particular for 10 ns–0.3 $\mu$s.

9. The method of claim 1, wherein the conversion of the analog values stored in the analog value storage means into digital values is carried out by means of one single A/D converter, the digital values from the A/D converter being stored in various buffers, and the digital values being read out from said buffers and memorized in a final memory unit.

10. The method of claim 4, wherein the digital value storage means for storing the digital values include a plurality of memory modules.

11. The method of claim 4, wherein the digital value storage means for storing the digital values include a RAM.

12. A method for directly digitizing microwave signals reflected on a filling product surface of a filling product in a receptacle, the method comprising:

scanning the microwave signals reflected on the filling product surface at a first rate for generating individual analog values;

storing the individual analog values in an analog value storage means;

reading the stored individual analog values from the analog value storage means at a second rate, wherein the second rate is lower as compared to the first rate;

converting the individual analog values into digital values by means of a plurality of A/D converters; and supplying the digital values to an evaluation means for determining a filling level height.

13. The method of claim 12, wherein the digital values of the plurality of A/D converters are stored in buffers, wherein the buffers are respectively allocated to the plurality of A/D converters, and wherein the digital values are read out from the buffers and stored in digital value storage means.

14. The method of claim 12, wherein the method is performed in an electric circuit accommodated in a filling level measuring device.

15. A device for directly digitizing microwave signals reflected on a filling product surface of a filling product present in a receptacle, the device comprising:

a reception circuit for receiving the reflected microwave signals which has a high scanning rate for scanning the reflected microwave signal and for generating analog values;

an analog value storage means connected to the reception circuit for storing the analog values at a high storing rate, wherein the high storing rate corresponds to the high scanning rate;

at least one A/D converter connected to the analog value storage means for converting the stored analog values into digital values; and a control means for controlling the reception circuit and the at least one A/D converter in such a manner that the reflected microwave signals are scanned at the high scanning rate and are stored in the analog value storage means at the high storing rate corresponding to the high scanning rate, that the stored analog values are read out from the analog value storage means at a read-out rate, wherein the read-out rate is lower than the high scanning rate, and that the digital values are made available to an evaluation means for determining a filling level height.

16. The device of claim 15, wherein the reception circuit includes an amplifier means for amplifying the received microwave signals, whereby a frequency of the microwave signals is not or only slightly changed.

17. The device of claim 16, further comprising:

a digital value storage means connected to the at least one A/D converter and the control means, wherein the digital value storage means are provided for storing the digital values.

18. The device of claim 16, wherein the digital value storage means includes a RAM.

19. A device for directly digitizing microwave signals reflected on a filling product surface of a filling product present in a receptacle, comprising:

a reception circuit into which the reflected microwave signals can be fed, and which is realized having a predetermined scanning rate for scanning the reflected microwave signals, wherein the reception circuit generates analog values;

an analog value storage means connected to the reception circuit for storing the analog values at a storing rate, wherein the storing rate corresponds to the scanning rate;

at least one A/D converter connected with said analog value storage means for converting the stored analog values into digital values;

a digital value storage means connected to said A/D converter for storing the digital values; and a control means for controlling the reception circuit and the at least one A/D converter and the digital value storage means in such a manner that the microwave signals are scanned at the predetermined scanning rate, and are stored in the analog value storage means at the storing rate corresponding to the scanning rate, that the stored analog values are read out from the analog value storage means at a read-out rate, wherein the read-out rate is lower than the scanning rate, and are converted into digital values in the at least one A/D converter, and that the digital values are made available to an evaluation means for determining a filling level height.

20. The device of claim 19, further comprising at least one buffer, wherein the at least one buffer is connected between the at least one A/D converter and the digital value storage means.

21. The device of claim 19, wherein the at least one A/D converter is operational for a time span of 1 ns–0.5 µs, in particular 10 ns–0.3 µs.

22. A filling level measuring device working on the transit time principle and emitting microwave signals, the filling level measuring device comprising:

a reception circuit into which the reflected microwave signals can be fed, and which is realized having a predetermined scanning rate for scanning same, wherein the reception circuit generates analog values;

an analog value storage means connected to the reception circuit for storing the analog values generated by the scanning in the reception circuit, wherein the storing is performed at a storing rate, the storing rate corresponding to the scanning rate;

at least one A/D converter connected to the analog value storage means for converting the stored analog values into digital values; and a control means for controlling the reception circuit and the at least one A/D converter and the digital value storage means in such a manner that the microwave signals are scanned at the predetermined scanning rate, and are stored in the analog value storage means at the storing rate corresponding to the scanning rate, that the stored analog values are read out from the analog value storage means at a read-out rate, wherein the read-out rate is lower than the scanning rate, and are converted into digital values in the at least one A/D converter, and that the digital values are made available to an evaluation means for determining a filling level height.

23. The filling level measuring device of claim 22, wherein the filling level measuring device is connectable to a two-wire loop, via which ensues the energy supply as well as the communication.

24. The filling level measuring device of claim 23, wherein the two-wire loop is a 4–20 mA two-wire loop.

25. The method of claim 1, wherein the method is performed in an electrical circuit accommodated in a filling level measuring device.

* * * * *